FIG. 1

INVENTORS
JOHN M. BIGOWSKY
JOSEPH J. RILEY
BY
ATTORNEY

INVENTORS
JOHN M. BIGOWSKY
JOSEPH J. RILEY
BY Francis J. Klempay
ATTORNEY

INVENTORS
JOHN M. BIGOWSKY
JOSEPH J. RILEY
BY *Francis J. Klempay*
ATTORNEY

United States Patent Office 3,493,715
Patented Feb. 3, 1970

3,493,715
TRANSISTORIZED SEQUENCE TIMER FOR
RESISTANCE WELDING MACHINES
John M. Bigowsky, Youngstown, and Joseph J. Riley,
Warren, Ohio, assignors to The Taylor-Winfield Corporation, Warren, Ohio, a corporation of Ohio
Filed May 9, 1966, Ser. No. 548,523
Int. Cl. B23k 11/00, 11/24
U.S. Cl. 219—114                                16 Claims

ABSTRACT OF THE DISCLOSURE

An electronic sequence timer for programming an electric resistance welding machine having facilities for controlling the magnitude of the welding current and for effecting, in sequence, a squeeze-time phase, a weld-time phase, and a hold-time phase. A single binary counter (but which may include sections, such as unit and ten sections) includes a series of switches for setting each of the respective phases in sequence. The operation of the machine is effected in accordance with the output generated by such counter. An electronic stepper switch network, comprised of a plurality of pairs of coupled transistors, progresses the interconnection of said switches. Means are provided to impress counting pulses of alternating half cycles of uniform frequency on said counter appearing near the ends of the alternating half cycles of a commercial source of A.C. The stepping switch network resets said counter back to its selected manual preset condition upon the completion of each of the respective phases of the cycle so that all said phases are counted by the same single binary counter.

---

This invention relates to an improved fully automatic control for sequencing the actuation of successive component steps of a complete operational cycle and for controlling, with extreme precision and consistency, the duration of the respective steps of the cycle. The primary object of the invention is to facilitate not only changes in the overall composition of the steps in the cycle—i.e. the selective dropping out of one or more of the steps of the complete schedule—but also changes in the time durations of the respective step activations which are retained in the overall cycle or schedule. The apparatus of the invention is of particular utility in the automatic control of a resistance welding cycle wherein, it is normally required to individually time and successively activate the phases or steps of squeeze time, flow of welding current, hold time and off time, the latter meaning the interval between successive complete cycles of a welding machine switched for automatically repetitive welding. This is all well known in the art as is also the selectively desired additions of preheat, abrupt application of high forging pressure, post heat and temper. Further, it is often desired to control the rates of buildup and decline of any heating current flow and many schedules require during one or more of the heating current steps translation of only a predetermined portions of the consecutive half cycles of the power source—commonly termed heat control in the art. Accordingly, the invention provides improved arrangements for effecting this required flexibility in the composition of the overall cycle, the improvements resulting in greater accuracy, consistency, and ease of manual setup as well as the resolution of the circuits required into more practical physical arrangements for manufacture and servicing.

More specifically, the invention seeks to provide, in a control complex of the general nature outlined above, of an improved arrangement for establishing the different time intervals required in the selected successive step activations, and for impressing these intervals on the successive sequencing circuits required. In accordance with the prior art and the known convenience of the same, the basic timing quantities in the control system of this invention are derived from the 60 cycle alternations of the commercial current source, but this invention provides improvements in this basic concept in that binary coded decimal counters are used for the timing wherein the input pulsation is improved and wherein the output signals always arrive at the same physical fixed conductors of the circuitry for more accurate, consistent and rugged operation and greater ease of servicing and manufacturing as results from the ability to better arrange subassemblies of the general or overall control for connection and grouping in a wholly practical manner.

Another specific object of the invention is the provision in a transistorized control complex of the general character outlined above of an improved arrangement for effecting the heat control in any and all of those step components of the overall cycle which require the flow of heating current between the electrodes of the welding machine. The aim here is to simplify the circuitry, to make maximum use of the advantageous characteristics of solid state control components in their application to the heat control functions at hand, and to facilitate monitoring and servicing as well as improving dependability and facilitating the physical construction in the general manner suggested above. Also, as will appear later, the heat control principles utilized in the present invention increases the dependability of and facilitates the interconnection into the control complex of means to regulate the rate of rise or decline of the current flow (up slope or down slope) and tempering current when used.

Yet another more specific object of the invention is the provision of an improved arrangement for effecting the sequencing of the required and/or desired phases or steps of the overall cycle. This improvement is effected in the present invention by using a stepper type of network which is characterized by ring rather than binary operation, wherefore the number of components required is reduced and automatic recurrent or successive traverses of the cycle as well as the initial setting up of the composition of the cycle is facilitated. It is possible in this stepper type of sequencing network to readily drop out any of the functions not required in a particular welding schedule, and by the use of an improved circuit arrangement for resetting the counters which are individual to the respective functions at the expiration of the respective function intervals it is possible to provide a wholly practical complex which functions with great dependability even though some of the intervals are extremely short. In this connection, the invention teaches how the extreme rapidity potential of solid state control components may be availed of to provide a control complex of the general nature first outlined above of greater versality and dependability than has heretofore been possible. Also, and as will appear later, the invention teaches the maximum multiple utilization of individual components to simplify the circuitry; thus facilitating its manufacture, monitoring, and maintenance.

The above and other objects and advantages of the invention will become apparent from the following description and accompanying drawing wherein there is disclosed the preferred embodiment of the invention.

Figure 1:
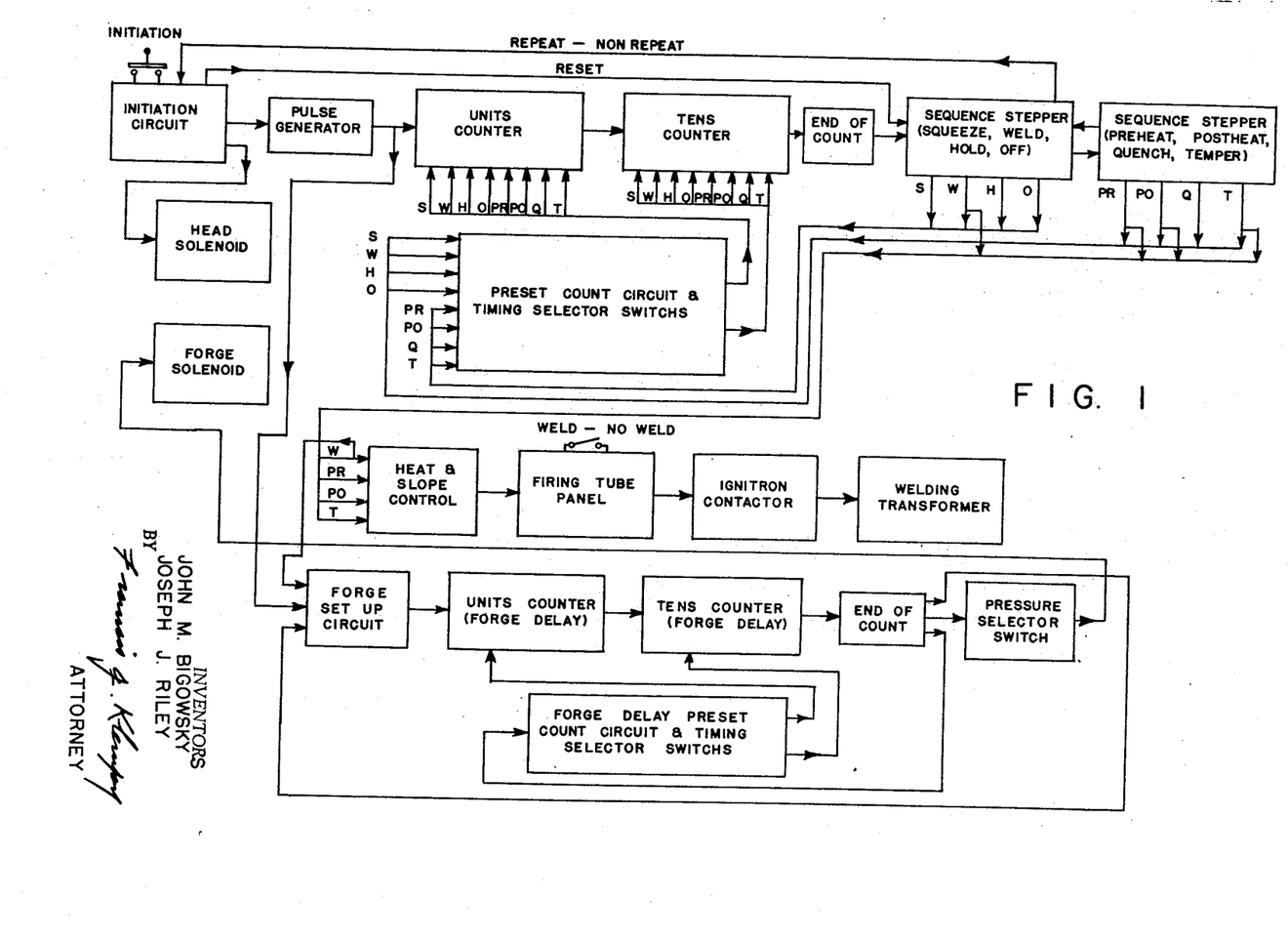
FIGURE 1 is a highly schematic showing of the entire control complex of which the novel features of the present invention are component parts.
Figure 2A:
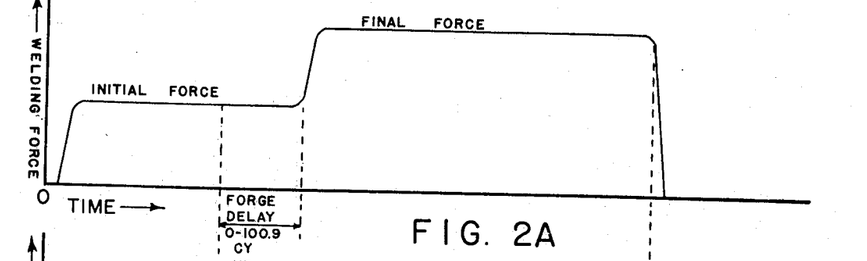
FIGURE 2A and 2B are positionally related charts showing the relation in time between the welding pressure or force which may be applied between the welding electrodes of a resistant welding machine and all of the heating currents with slope control which may be furnished the electrodes during a complete welding cycle or schedule.
Figure 2B:
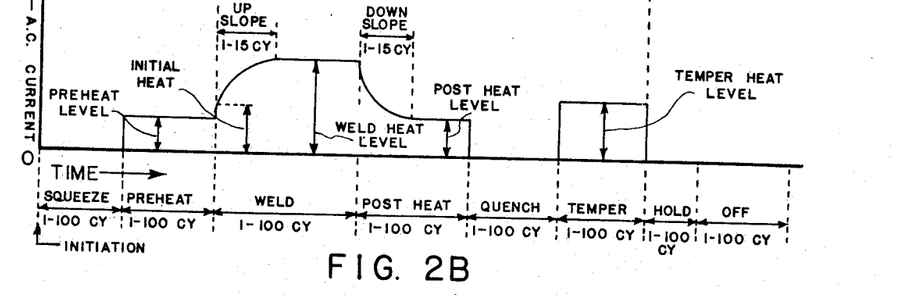

At the outset, and referring to FIGURE 1, it should be noted that the letters appearing on this figure designate successive functions of the overall cycle or weld schedule as follows:

S—Squeeze time
W—Weld time
H—Hold time
O—Off time
PR—Preheat time
PO—Postheat time
Q—Quench time
T—Temper time As suggested above, only the first four of the above functions are used at all times although under some manual conditions even the Off time may be omitted. The other steps may be selectively omitted as required, and it should be understood that the sequence stepping circuit (to be hereinafter described) operates to simply bypass, without delay, any of the functions dropped out in setting up the particular cycle or schedule at hand. It is also true that the forge setup and delay apparatus with the accompanying forge solenoid may or may not be used in any particular schedule, and the same is als true of the slope control (up and down—see FIG. 2B). It will be understood by those familiar with the resistance welding art that when a resistance welding machine is fitted for forge control a special actuating mechanism is provided for the movable electrode, the mechanism having a forged solenoid which when energized (sometime during the flow of welding current or shortly thereafter) acts to abruptly increase the force applied through the electrodes. Also, it is common practice to fit a "WELD—NO WELD" switch to allow the machine to run through its complete cycle without the flow of any heating current whatever to facilitate setup.

To keep the number of drawing sheets and the length of this specification within bounds, the showing herein is not of a complete sequence system but, rather, an attempt has been made to limit the showing to the novel aspects of the applicants' system, as will be described below. Thus, in a commercial embodiment the combination of a units and tens counter will be employed, the disclosure herein being of binary coded decimal type, but there is actually shown (FIG. 3B) only the tens counter. The addition of a units counter ahead of the tens counter is well within the skill of the art. In accordance with this invention there is a presetting switch for said complete counter for each function of the cycle, but in the drawing (also FIGURE 3B) only the squeeze timing presetting switch SW110 is shown—the switches for the other functions being suggested only in dotted outline. Also, the power ignitrons for translating the heating currents to the electrodes of the machine, as well as their immediate firing circuits, have been deleted since this subassembly is well known in the art and does not, per se, form any part of the present invention. It is sufficient to remember that transformers T128P and T129P (top center of FIG. 3D) provide the positive and negative firing pulses for the said subassembly. Further, no attempt is made herein to show the various power supplies required in the overall system since, again, these, per se, form no part of the present invention.

As explained above, the present disclosure is based, in large part, on use of binary coded decimal counters, and in the drawing the binary progression for the tens counter is comprised (on FIG. 3B) on the four Eccles-Jordan trigger circuits having the coupled transistors Q21, Q22; Q23, Q24; Q25, Q26; and Q27, Q28; respectively. Normally, on standby, the odd numbered transistors are fully conductive to initiate the progression of the binary actuation in each phase or function of the cycle, a pulse is impressed on conductor 10 from the units counter, and in both the units counter and the tens counter an output or directive signal is not achieved until all the following or even numbered transistors are rendered conductive. In these counting circuits, as well as throughout the circuit complex as a whole, the transistors and other solid state components operate as switching devices only, no need being for any modulation. As will appear below the function time setting switches like SW110 are arranged in the circuitry to preset the decimal coded binary counters to establish the remaining pulses necessary to reach 100 as the timing periods. In this manner the function initiating pulses are enabled to always appear on or in the same conductors which is advantageous for the reasons briefly outlined above.

Figure 3A:
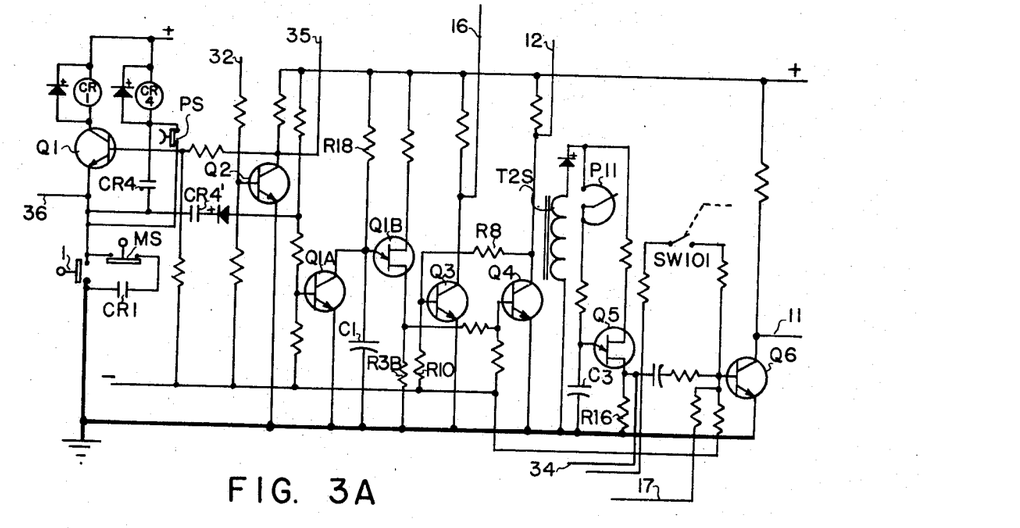
FIGURES 3A thru 3D, taken together, is a schematic showing of so much of the complete circuitry of the invention as is necessary to disclose the novel features thereof when reference is made to FIGURES 1, 2A and 2B.

In the circuit complex of this invention 60 cycle timing pulses are generated continuously both during standby and during all the phases or steps of the operational cycles, including off periods. As will appear later these pulses are impressed, at proper times, on the counting circuits and the nature of the pulse wave forms are especially tailored to insure the absolute dependability of the operation of the counters. In accordance with usual practice the welding machine will have a solenoid which is energized to admit operating air to a head cylinder which closes the movable electrode of the machine onto the work with an initial or normal force required for welding. As pointed out above, a second solenoid and associated mechanism may be cut into the control and machine to give a final or forging force, if desired, but in either arrangement it is also common practice to employ a pressure responsive switch which delivers the start of squeeze time in each cycle until such initial or welding force is attained upon closing movement of an electrode. Referring now to FIGURE 3A, the machine is conditioned for going through its precomposed cycle, either automatically repetitive or in manually selected cycle-by-cycle manner by the closing of an initiating switch I which through transistor Q1 energizes a relay CR1, a contact of which energizes the welding machine head solenoid, not shown herein. Relay CR1 has a normally open holding contact which maintains the preconditioning of the system for automatic repeat operation, the transistor Q1 being suitably controlled through circuits including switches SW101 (FIG. 3A) and SW101' (FIG. 3C) to turn off the transistor Q1 at the end of a cycle of operation when repetition is not desired. As shown, both these switches are open when the system is set for non-repeat operation. A normally closed manual switch MS may be opened to interrupt the progression of any cycle and allow the welding machine head to retract at any point in the cycle.

When a proper initial squeeze and/or weld force is attained at the start of any cycle, a pressure switch PS is automatically closed and remains closed during the balance of the cycle until Off time is reached. Closure of of PS energizes a relay CR4 which through a holding contact CR4 remains energized and which has a normally open contact CR4' which triggers off transistor Q1A. During all of this time and beginning with the initial general electrical energization of this system, the above mentioned counting pulses are being generated by the transistor Q5 and gated for release by transistor Q6 to a conductor 11 which leads to the units counter, not shown herein as explained above. Transistor Q6 is the gate in the sense that during standby it conducts continuously and thus no triggering pulses can go to the flip-flop binary circuits. While at the start of any period to be timed as directed by a stepper circuit to be hereinafter explained, this transistor is normally non-conducting and transmits only the pulses generated by the unijunction transistor Q5. The enabling potentials are developed across resistance R16, and it should be observed particularly that the potentiometer P11 in conjunction with the capacitor C3 delays the conduction in Q5 toward the end of the positive half cycles furnished by the source T2S. The characteristics of the unijunction transistor Q5 permits the disclosed arrangement of its enabling circuit as shown, and the net result is most advantageous in industrial equipment because of dependability and consistency and the avoidance of any tendency of transients or other abnormalities to inject false counting pulses.

Returning to the initiation aspect of the control, when the transistor Q1A turns off as above mentioned a capacitor C1 begins to charge through resistor R18 and unijunction transistor Q1B conducts when the charge on capacitor C1 is sufficient. It is obviously desirable that the initiation of the cycling of the functional phases, particularly on "repeat" or automatic operation that thereby no false beginnings (at termination of stepper ring progression, for example). This is accomplished by selecting the parameters of capacitor C1 and resistance R18 so that the time required to charge up the capacitor is well beyond the bounce range of the contacts of the relay CR4. Thereafter, the potential developed across resistor R3B because of conduction in Q1B turns on transistor Q4 lowering the voltage in conductor 12 which in FIGURE 3B turns off a transistor Q32. It should be noted that when transistor Q4 turns on, transistor Q3 is cut off whereby its collector swings far positive. As a result the transistors Q34 (FIG. 3C) and Q 55 (FIG. 3B) become reversely biased through conductor 16 and these last two transistors will be cut off. The extinguishment of the transistor Q55 conditions them for subsequent pulse-inspired conduction as will now appear.

Figure 3B:
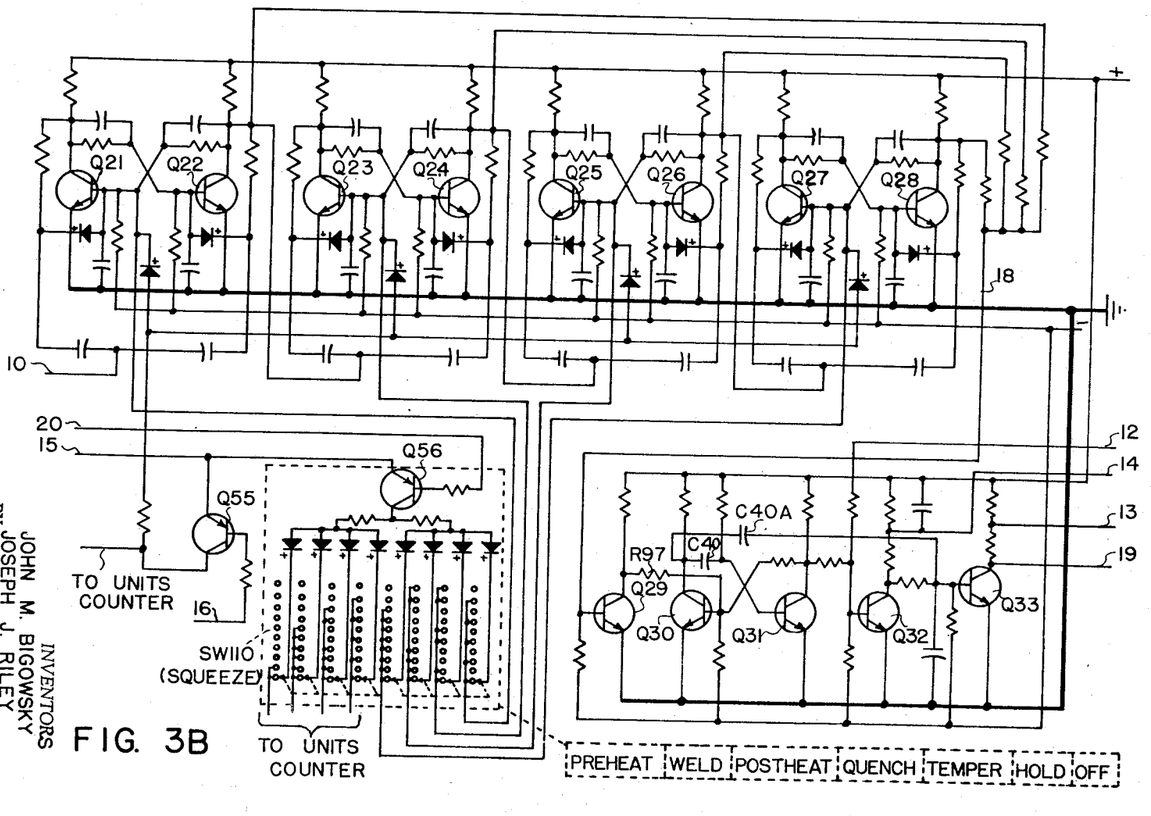

Simultaneously with the above mentioned conduction of Q4 a negative going bias impressed on the base of transistor Q3 through resistors R8 and R10 turns off Q3 and the resulting rise in potential in conductor 16 turns off transistor Q34 (FIG. 3C) and through conductor 17 turns off transistor Q6 (FIG. 3A). Turned-off transistor Q6 is now conditioned to accept counting pulses from Q5 which make Q6 conduct during each pulse. After Q6 cutoff the first arriving pulse from Q5 establishes the first counting pulse and through conductor 11 (FIG. 3A—having correspondence in conductor 10 FIG. 3B) the units and tens counters progress to their full ends whereby all the even numbered transistors of the bistable couples are conducting. This imparts sufficient negative going potential into conductor 18 (additive response) to turn off transistor Q29 (FIG. 3B) and through R97 turn on Q30 of a monostable couple comprised of the transistors Q30 and Q31. Capacitor C40 begins to charge and there follows a short period of conduction in the couple transistor Q31. Of course, Q30 is then momentarily turned off and a capacitor C40A is charged to turn off Q33. The resultant positive going pulse impressed on conductor 19 first, during the initiation phase or set-up, bucks down or blocks the conduction in a transistor Q36 (3C) which in turn turns a following transistor Q37 off. During this time and since the initiation of conduction in transistor Q32 the signal through conductor 14 has turned transistor 35A on to complete through conductor 15 the emitter-collector circuit through transistor Q55 (FIG. 3B). Also, the corresponding circuit has been completed through a transistor Q56 which is in series with the sequence setup switch 110 shown in FIGURE 3B. Q56 is thus conditioned for conduction upon the appearance of a proper control pulse appearing in conductor 20 (FIGS. 3B, 3C), the latter appearing when a capacitor C45 charges upon turning off of the transistor Q37. Immediately upon such first conduction of the transistor R56, the respective bistable couples of the counters are preset to the conditions directed by the SW110 switch. Now, the next succeeding timing pulse generated by Q6 is applied to the units counter (or to the tens counter if the preset on the units counter is ten). The following timing pulses generated by the transistor Q6 now progresses the tens (or both the units and tens counters) until the end of the counting or time period is reached and all the even numbered bistable transistors are on which in the stage now completed is the end of squeeze time. As explained above, this termination is sensed in conductor 18 and operates to initiate the next succeeding desired function or step, which initiation beginning with the resetting of the counters to the conditions or values predetermined by the associated presetting switch therefor which would correspond to SW110 shown in FIGURE 3B. This initial presetting of the counters is accomplished in the manner outlined above for the squeeze time function, it being understood that a control component corresponding to Q56 is associated with each of the manual setable count switches.

Figure 3C:
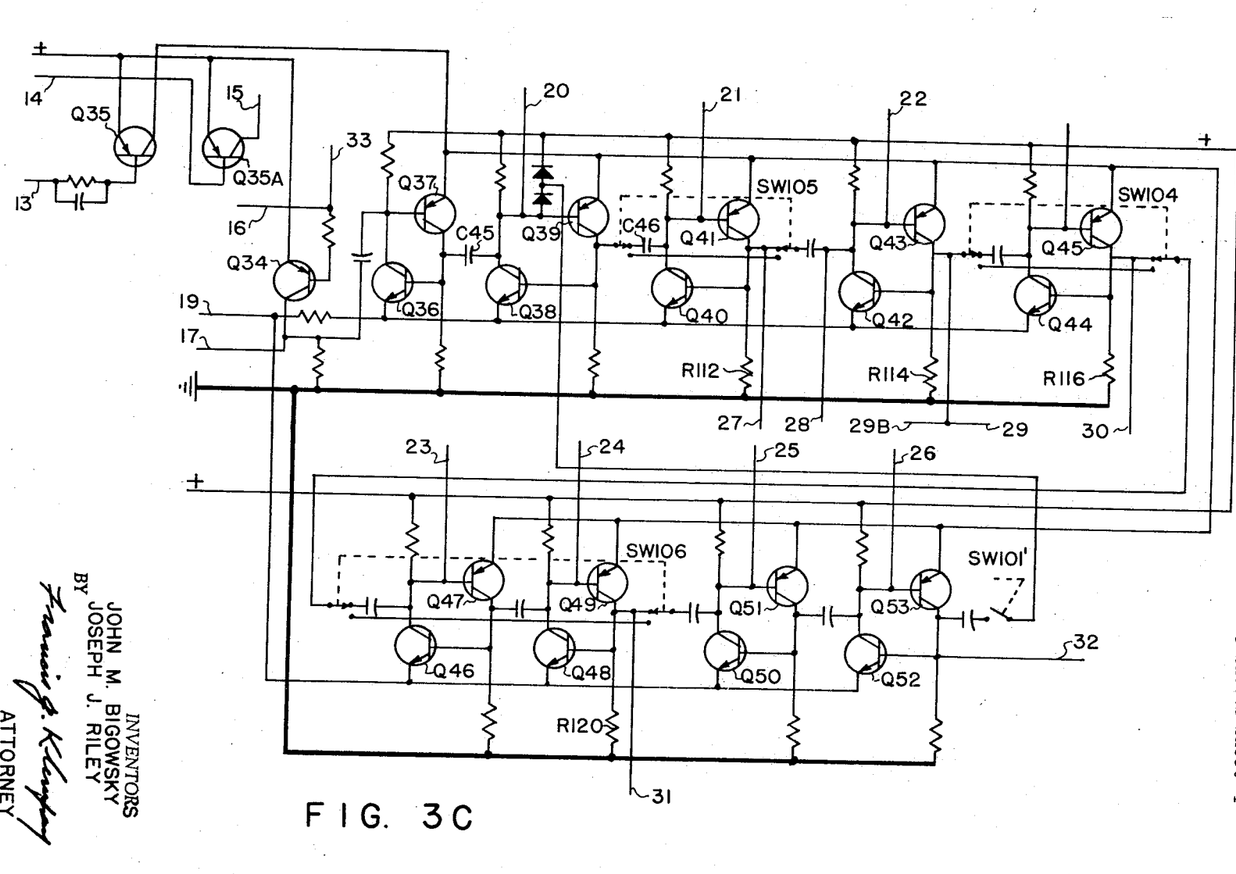

The progression of the functions or steps of the complete cycle to their full ring completion and the resultant de-energization of transistor Q1 and the retraction of the welding head is accomplished by a stepper circuit assembly which is shown in FIG. 3C. The stepper circuit includes various paired control transistors which can be identified in relation to the successive functions of the machine cycle as follows:

| | On during timing |
|---|---|
| Squeeze time | Q38 and Q39 |
| Preheat time | Q40 and Q41 |
| Weld time | Q42 and Q43 |
| Postheat time | Q44 and Q45 |
| Quench time | Q46 and Q47 |
| Temper time | Q48 and Q49 |
| Hold time | Q50 and Q51 |
| Off time | Q52 and Q53 |

At the beginning as well as at the end of any function, including the initial preparation of the control complex, the signal through conductor 18 triggers off Q29 (FIG. 3B) and this results, as explained above, in the impression of a control pulse onto conductor 19 to effect the cascade operation of the transistor pairs in the stepper section. Thus, at the end of squeeze time, the emitter circuit for transistor Q40 is momentarily opened and by reason of the resultant change in charge of a capacitor 46 the coupled transistor 41 is turned on. The resultant negative going bias impressed on conductor 21 will turn on the series transistor (not shown but corresponding to Q56) associated with the preheat presetting switch (corresponding to SW110) and preheat will then begin. Similarly, progressing through the cascade of the stepper section signals impressed on conductors 22 through 26 will initiate the timing of these successive functions utilizing the units and tens counters.

Also, on FIGURE 3C there is shown conductors 27 thru 32 for gating other tasks during the transitions between the respective timing intervals. Thus and for example, a signal generated in conductor 27 at the end of squeeze time (beginning of preheat time) is impressed on the bases of transistors Q3H and Q16H in FIGURE 3D, which figure deals with the heat control section of the circuit complex. The heat control has variable resistors P4H and P5H for determining the preheat level, variable resistor P3H for weld heat level, variable resistors P10H and P11H for postheat level, and variable resistors P6H and P7H for quench heat level. This heat control section will be described later. It should also be observed that the stepper section has a manual switch SW105 by which the preheat step may be omitted from the complete cycle, a manual switch SW104 by which the postheat step may be omitted, and a manual switch SW106 by which the quench and temper phases may be eliminated. It will be understood that the various heat control manually-settable variable resistors are used to program the operational cycle or cycles of the machine insofar as the flow of any heating current is involved or required.

Figure 3D:
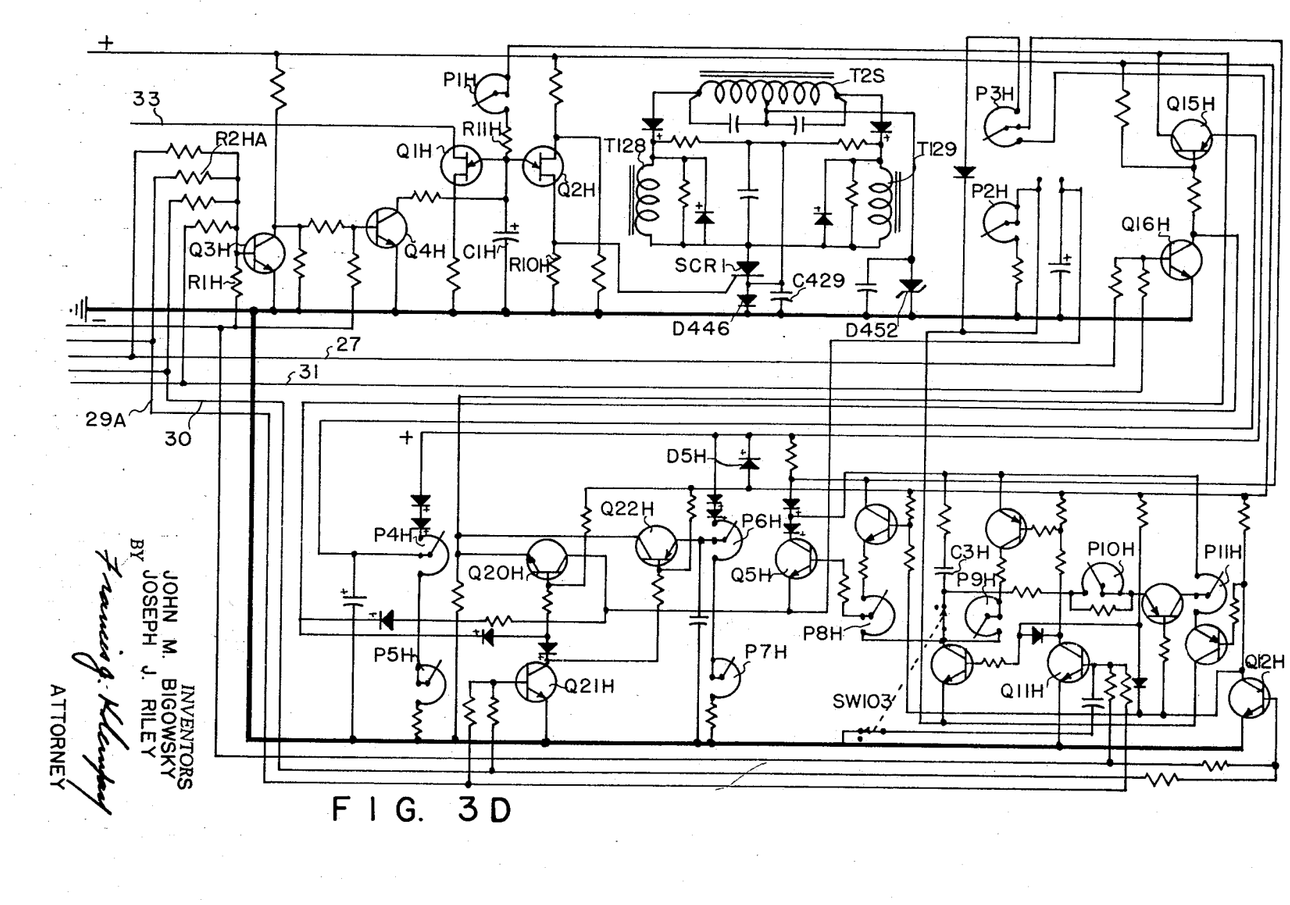

In addition to the above heat controls, the invention provides means for varying the rate of rise of the weld current at the beginning of the welding phase and the rate of decline of such current at the end thereof. In FIGURE 3D switch SW103 determines whether or not upslope control is to be used in the welding schedule, and this switch is closed when such function is to be inserted. A potentiometer P9H determines the rate of discharge of a capacitor C3H and this controls the rate of use of the heat level of the welding current from an initial minimum value of 20% (determined by setting of potentiometer P2H) to the maximum adjusted welding heat level which is predetermined by the setting of the potentiometer P3H, the same being accomplished by the circuitry shown in FIGURE 3D. At the end of weld time the signal impressed by the stepper circuit of FIG. 3C on conductor 30 is sensed in FIG. 3D. This signal first, acting through transistor Q3H, interrupts the normal functioning of the weld heat control and through Q12H initiates the downslope phase which consists of controlling the rate of recharge of capacitor C3H through the variable resistors P10H and P11H. It should be noted from the stepper circuit of FIG. 3C that if manual switch SW104 is open to delete the postheat step the circuit comprised of the conductor 30 is inoperative and consequently the downslope control is inoperative.

As stated initially above, the present invention includes a novel and advantageous arrangement for regulating the heat levels during all phases of flow of the heating currents. The novelty resides in independently timing the delay of the enabling impulses to thyratrons, or other means used to fire the ignitrons, all not shown, rather than simply shifting in phase relationship the pulses which are received during the heating periods. Referring now to the top left of FIG. 3D, unidirectional 120 pulses per second are received thru conductor 33 by suitable conversion from the main AC source, and these pulses trigger on a unijunction transistor Q1H at the same time during each successive alternations of the source. During any heating time transistor Q4H is off permitting a capacitor C1H to charge although it should be noted at this point that the prior conduction in Q4H discharged this capacitor and biased off both the unijunction transistor Q1H and a second similar transistor Q2H, the function of which will be given below. Near the end of each alternation Q1H will be momentarily pulsed on which insures that C1H will always begin to charge from a uniform level. The charging circuit for C1H may be traced through a resistor R11H, a calibrating potentiometer P1H, transistors Q20H and Q5H, heat control potentiometer P3H and diode D5H toward the positive bus of the suitable power supply. At the preset time during each cycle the charge level of capacitor C1H becomes sufficient to turn on unijunction transistor Q2H and the resultant voltage developed across R10H is used to bring on a controlled rectifier SCR1 which is in the energizing circuits for the above referred to transformers T128 and T129. It should be noted that since the capacitor C1H always begins to charge from a uniform level which is made possible by conduction in Q1H regardless of the settings of the control potentiometers P1H and P3H the heat control will be firm and dependable and not subject to irregularities due to transients or extreme settings of the potentiometers.

One of the problems encountered in circuitry of the general character involved herein when used for a multiplicity of heating functions such as preheat flow, rate of buildup and decline of welding current, welding current, and postheat or temper current is the separation of the functionings sufficient to avoid any interaction or interference between the same without enormously complicating and duplicating the components and specialized circuits required. This problem is overcome in the present invention primarily by the use of the silicon controlled rectifier SCR1 which is common to all the various heating functions and the specialized circuits used to control the firing of the power-translating ignitrons during the various functions. The general system is advantageous in reducing the overall circuit complex and in providing a practical and wholly complete solid state control for energizing the firing or pulsing transformers of the full-wave ignitron contactor. However, certain difficulties do appear due to the somewhat erratic behavior of controlled solid state rectifiers when used for the transmission of appreciable power, it being obvious that in the general application of the present invention the firing control rectifier must dependably pulse on and off during each consecutive half cycle of the time periods of the respective functions and at precisely controlled times during the consecutive half cycles.

To avoid any intermingling of the control functioning in the different aspects of the heating phases, we provide a Zener diode D452 in the series circuit of the full-wave power supply T2S, the pulsing transformers T128 and T129 and the controlled rectifier SCR1. The function of the diode is to provide a high resistance in this energizing circuit to insure that the rectifier SCR1 goes to complete cutoff when the voltage in the energizing circuit reaches a predetermined minimum toward the end of each half cycle of energization, it being well known that a Zener diode may be effectively used for such voltage regulation. When the diode D452 forces to conduct the resultant high resistance interposed in the energizing circuit causes the current to drop far below the sustaining or holding current of the rectifier SCR1, and the latter must accordingly be fully nonconducting at the start of the next succeeding half cycle pulse as directed by the timers and the various heat controls directed toward it.

Considering further the heat level regulation circuits disclosed herein it should be noted that at the start of weld time (or preheat, or postheat, or temperheat times) a positive going gating signal developed across R114, (or R112, R116 or R120 depending on whether or not preheat, postheat or temper is used) of the sequence stepper for WELD is coupled to the heat control circuit through resistor R2HA. This square formed gating signal is applied to the base of transistor Q3H turning it on. Prior to weld time transistor Q3H was off (assuming preheat was not used) because its base was reversed biased by the —15 volts applied through resistor R1H. The square formed gating signal lasts for one cycle or multiple of one cycle according to the set weld time. The duration of this gating signal insures that for any set weld time the ignitrons conduct for the same length of time (lead-trail firing). During this weld time, the capacitor C1H begins its charge from a fully de-energized condition in each consecutive half cycle of the general AC source, and since the same circuit elements are used for charging this capacitor C1H in each alternation there is balanced and symmetrical firing of the ignitrons.

When capacitor C1H is sufficiently charged unijunction transistor Q2H will fire, discharging capacitor C1H through resistor R10H. The positive going pulse developed across resistor R10H is coupled to the gage of controlled rectifier SCR1, and overcomes the bias present across capacitor C429 and SCR1 is turned on for the remainder of the (one) alternation (½ cycle). To provide a gate bias source for SCR1 a diode D446 is placed in series with its cathode circuit to store energy in a capacitor C429. This arrangement has the advantage of preventing transient or noise voltages from mis-triggering SCR1 thereby lending further stability to the control of the firing circuits for the ignitrons.

When a preheat phase is desired in the weld schedule the switch SW105 shown near the top center of the stepper section in FIG. 3C is closed, and at the end of squeeze time a pulse is imparted to conductor 27 which, as shown in FIGURE 3D, turns on a transistor Q16H which in turn causes a transistor Q15H to become conductive while turning off Q20H. The effect of this is to place the preheat level potentiometers P4H and P5H in the charging circuit for the capacitor C1H so that the latter is not, at this stage, controlled by the main heat level potentiometer P3H. Of course, the time duration of the preheat phase is determined by the preset preheat counter mentioned above, the turning-on signal being triggered through a conductor 21, and the turning-off signal being impressed through conductor 29.

Similarly, when a postheat phase is included in the complete cycle the manual switch SW104 in the stepper section on FIG. 3C is closed, and to initiate this postheat phase the pulse which is generated in conductor 30 to initiate downslope as above explained also acts to turn on a transistor Q21H, and turn on a transistor Q22H and while turning off transistor Q20H so that the postheat control potentiometers P6H and P7H now control the rate of charge of capacitor C1H rather than utilizing the main heat control potentiometer P3H for this purpose. At the end of postheat time its decade counter operates to terminate this phase after which the control is stepped to quench and temper, if used, or directly to hold time and then off.

From the above, it should be apparent that the general control complex herein disclosed provides for three main independent heat levels which are preheat, weld heat, and temper heat. The control of weld heat may be supplemented, if desired, by upslope operation and postheat or down-slope operation, all as described above. One of the important aspects of the invention is the isolation of the three main heat levels by the use of switching transistors which by reason of their instantaneous and dependable characteristics insures that these various heat levels do not affect each other. At preheat the level is determined by the setting of P4H and is gated through transistor Q15H to determine the time in each consecutive half cycle at which capacitor C1H reaches its sufficient potential to trigger on the unijunction transistor Q2H and thus energize SCR1. At weld time, the heat level is controlled by the setting of P3H and gated through transistors Q5H and Q20H. At temper, the level is determined by the setting of P6H and gated through transistor Q22H. In preheat and temper heat, the transistors isolate the weld heat potentiometer P3H.

In up-slope operation, the upper limit of heat is clamped to the setting of P3H while the minimum (initial) level is clamped to the setting of potentiometer P8H, and the charge on up-slope capacitor C3H is tracked through transistor Q5H into the main weld heat level circuit. For down-slope operation, the upper limit of heat control is, of course, clamped to the setting of P3H while the minimum (final) level is clamped to the setting of P11H, and the timed charge on capacitor C3H is again tracked through transistor Q5H into the main weld heat level circuit.

In conformity with the general scheme outlined above, the signal pulse appearing in conductor 29 at the beginning of weld time is translated through a connecting conductor 29B to a forge timer, not shown herein, and through suitbale circuitry, also not shown, whereby a solenoid is energized on the head of the welding machine to abruptly increase the clamping pressure of the electrodes as is well understood in the art. The forge timer or delay circuit referred to herein is fully disclosed in a co-pending application, but for sake of cross reference the conductors 33, 34, 35 and 36 are shown herein. Signals appearing in these conductors along with those appearing in conductor 29B and in conductor 28 generally control the forge delay circuit shown in such co-pending application.

Having thus described our invention what we claim is:

1. In an electronic sequence timer for programming an electric resistance welding machine having facilities for controlling the magnitude of the welding current and for effecting, in sequence, a squeeze-time phase, a weld-time phase, and a hold-time phase, the combination of a single binary counter including a series of switches for setting each of the respective phases in sequence, means to effect operation of the machine in accordance with the output generated by said counter, an electronic stepper switch network comprised of a plurality of pairs of coupled transistors to progress the interconnection of said switches, means to impress counting pulses of alternating half cycles of uniform frequency on said counter appearing near the ends of alternate half cycles of a commercial source of A.C., said stepping switch network being operative to reset said counter back to its selected manual preset condition upon the completion of each of the respective phases of the cycle so that all said phases are counted by said same single binary counter.

2. A system according to claim 1 wherein said means to impress counting pulses includes a unijunction transistor and a diode in series therewith and with a commercial source of A.C. for generating the counting pulses impressed on said counter in the form of energy surges appearing near the ends of alternate half cycles of a commercial source of alternating current.

3. A system according to claim 1 further characterized in that said counter consists of a plurality of pairs of bistably interconnected transistors, at least four of which are conducting at the end of the count, and further including circuit means responsive to said four transistors at the end of the count to trigger the stepping switch network to the next preselected phase.

4. A system according to claim 2 further including a circuit including a capacitor and a series connected charging circuit having a heat level determining potentiometer for determining the delay of conduction in said unijunction transistor in each consecutive half cycle, and a second unijunction transistor which is pulsed on at the end of each consecutive half cycle of the source to discharge said capacitor whereby the charging thereof begins at a uniform level in each consecutive half cycle of the source.

5. A system according to claim 4 further including means to trigger the firing of ignitrons to conduct predetermined portions of consecutive half cycles of an alternating current source during weld time, said means to trigger comprising pulse-producing transformers which are energized from said source under the control of a single controlled rectifier, the control circuit for the controlled rectifier comprising a unijunction transistor for triggering on said rectifier during each consecutive half cycle of the source.

6. A system according to claim 3 further including capacitors in the base circuits of said interconnected transistors whereby said counter is restrained against operation by the appearance of any surge or signal other than said counting pulses of uniform frequency.

7. A system according to claim 1 further including a circuit for initiating the programming of said timer from a standby or an off-time condition, said circuit including a relay and means for actuating said relay in response to the pressure exerted by the electrodes of said welding machine, said relay having at least one operated contact, a transistor for initiating said programming, and means comprising a capacitor and a charging circuit therefor to actuate said transistor, said capacitor and charging circuit having such parameters that said transistor cannot be actuated until after the expiration of the inherent bounce period of said contact.

8. A system according to claim 3 further including a manually resetable switch for each of said phases operative when connected to control the initial pattern of conduction in said interconnected transistors thereby preparing the counter for timing the next succeeding functional phase in the program, a transistor for connecting each of said switches with said interconnected transistors, and means to cause said last named transistors to conduct at the ends of the respective functional phases of the program.

9. A system according to claim 8 further including a gate circuit for translating counting pulses to said interconnected transistors, and means to interrupt said gate circuit at the end of each of the functional timing periods and during conduction of said last mentioned transistor in resetting the pattern of conduction in said interconnected transistors.

10. Apparatus according to claim 1 wherein said manual preset condition is manually variable over a wide range for each phase with the same output conditions for the maximum setting for each phase and wherein said single binary counter includes a unit section and a tens section.

11. A system according to claim 5 further including a Zener diode in series with said controlled rectifier to insure current cut-off in said rectifier at the end of each consecutive half cycle of the power source.

12. In an electronic sequence timer for programming an electric resistance welding machine having facilities for effecting, in sequence, a squeeze-time phase, a weld-time phase, a hold-time phase and an off-time phase, the combination of a circuit means to predetermine the portions of half cycles of the power source transmitted to the welding transformer during the weld-time, said circuit means including power-transmitting ignitrons and means to fire said ignitrons during predetermined portions of said half cycles, means to impress firing potentials on said ignitrons during the half cycles in accordance with the charge achieved on a capacitor, and a charging voltage circuit for said capacitor comprising a pair of variable resistances in series and circuit connections whereby the maximum setting of one of said resistances introduces maximum charging voltage and determines the maximum portions of the half cycles of welding current transmitted while the minimum setting introduces minimum charging voltage and determines the minimum porportions of the half cycles of the welding current transmitted, so as to avoid misfiring of the ignitrons due to the appearance of firing potentials late in the half cycles of the source, the other of said variable resistors determining said minimum charging voltage.

13. Apparatus according to claim 12 further including a third variable resistance to determine the rate of charging of said capacitor, and means operative at the end of weld time to render effective said third variable resistance whereby the heating current transmitted drops from a predetermined value as determined by the said one of said resistances down to a lower level at a predetermined rate as determined by the setting of said third variable resistance.

14. Apparatus according to claim 12 further including first circuit means operative at the beginning of weld time to control the rate of rise of the welding current, said circuit means operative at the end of weld time to control the rate of decline of the weld current, and switching circuits each including switching transistors to initiate operation of said first circuit at the start of weld time and of said second circuit at the end of weld time.

15. Apparatus according to claim 12 further including a preheat circuit for transmitting a predetermined level of power to the resistance welding transformer for a predetermined period of time preceding the weld-time phase, another circuit for transmitting a predetermined level of power to the resistance welding transformer for a predetermined period of time immediately following said weld-time phase, and switching circuits each including switching transistors to render operative said last mentioned circuits and said weld-time phase in proper sequence during progression of a complete cycle of operation of said welding machine.

16. A system according to claim 12 further characterized in that said means to impress firing potentials comprises said capacitor and means to charge said capacitor during each consecutive half cycle of the source and circuit connections to produce said firing potentials only when said capacitor reaches a predetermined charge, the said one of said resistances determining at what point during a half cycle said capacitor reaches said predetermined charge, and a second variable resistance to control the rate of charging said capacitor to thereby control the upslope of welding current at the start of weld time.

References Cited
UNITED STATES PATENTS

| | | | |
|---|---|---|---|
| 2,988,275 | 6/1961 | Thomason | 328—48 X |
| 3,031,622 | 4/1962 | Kirchner et al. | 328—75 X |
| 3,375,449 | 3/1968 | Ribour et al. | 328—48 |
| 2,862,114 | 11/1958 | Solomon | 219—114 |
| 3,141,950 | 7/1964 | Chiasson | 219—114 |
| 3,291,958 | 12/1966 | Glorioso | 219—98 |
| 3,315,062 | 4/1967 | Pease | 219—113 |
| 3,330,993 | 7/1967 | Ulrich | 219—114 |

JOSEPH V. TRUHE, Primary Examiner

D. F. DUGGAN, Assistant Examiner

U.S. Cl. X.R.

328—48, 75